March 27, 1951 P. BRINDLE 2,546,883
MACHINE FOR MOLDING CONCRETE BLOCKS
Filed Dec. 16, 1949 5 Sheets-Sheet 1

March 27, 1951 P. BRINDLE 2,546,883
MACHINE FOR MOLDING CONCRETE BLOCKS
Filed Dec. 16, 1949 5 Sheets-Sheet 2

Inventor
Percival Brindle
By Morris & Patterson
Attorneys

March 27, 1951   P. BRINDLE   2,546,883
MACHINE FOR MOLDING CONCRETE BLOCKS
Filed Dec. 16, 1949   5 Sheets-Sheet 3
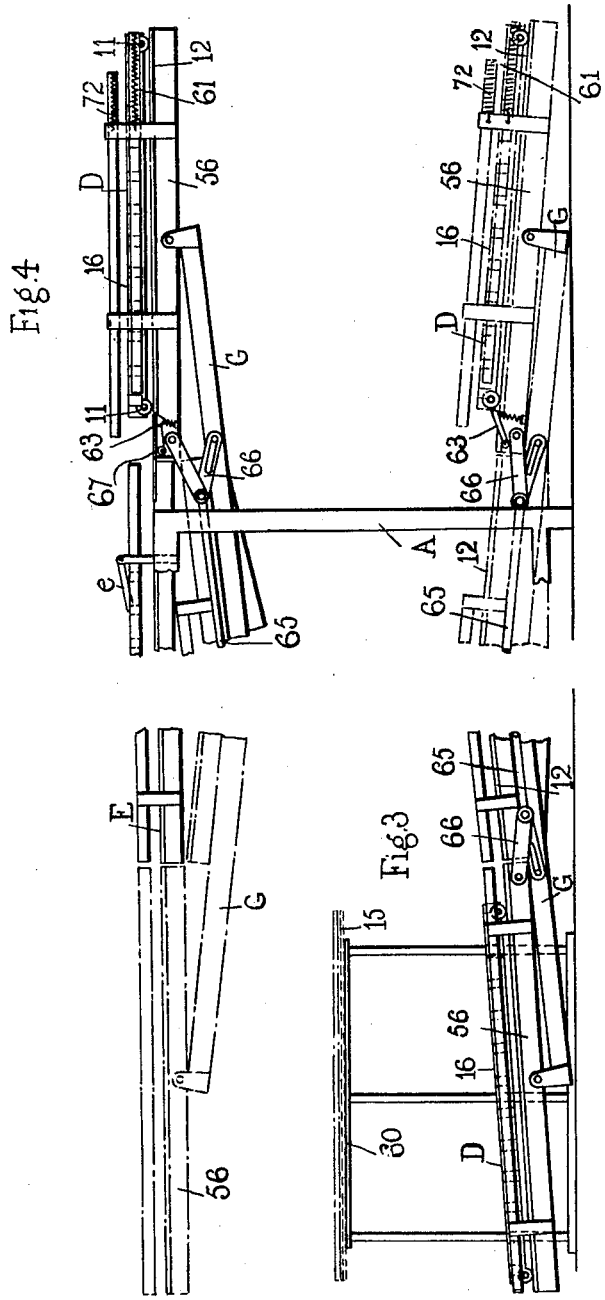
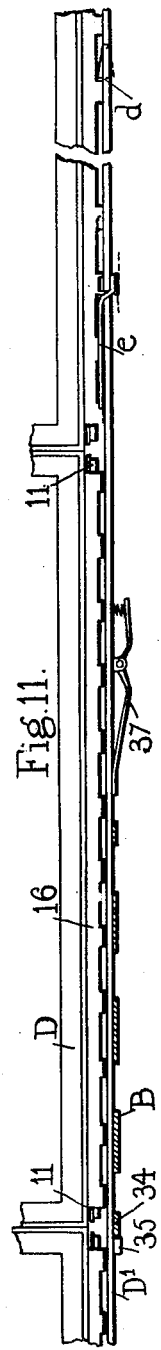
Inventor
Percival Brindle
By Morris & Bateman
Attorneys March 27, 1951 P. BRINDLE 2,546,883
MACHINE FOR MOLDING CONCRETE BLOCKS
Filed Dec. 16, 1949 5 Sheets-Sheet 4
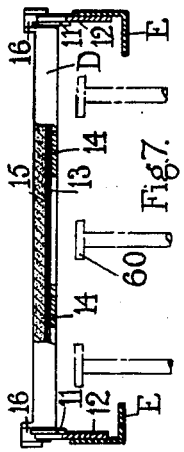
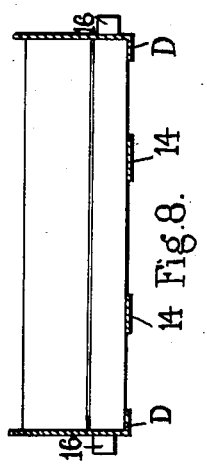
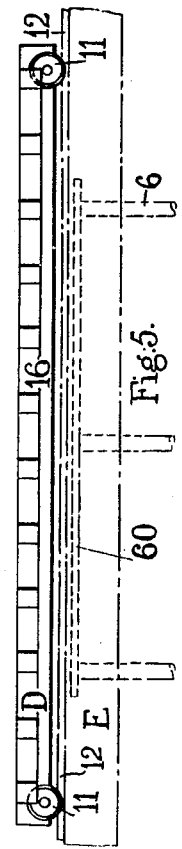
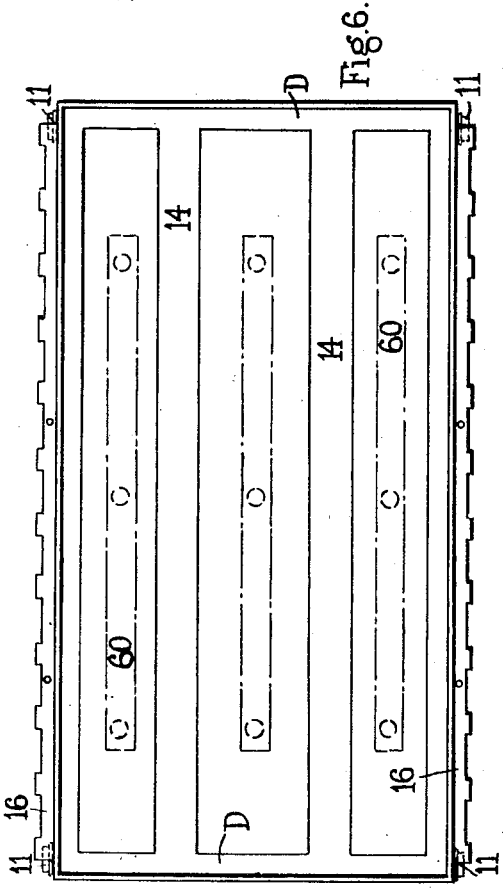
Inventor
Percival Brindle
By Harris & Patterson
Attorneys March 27, 1951 P. BRINDLE 2,546,883
MACHINE FOR MOLDING CONCRETE BLOCKS
Filed Dec. 16, 1949 5 Sheets-Sheet 5
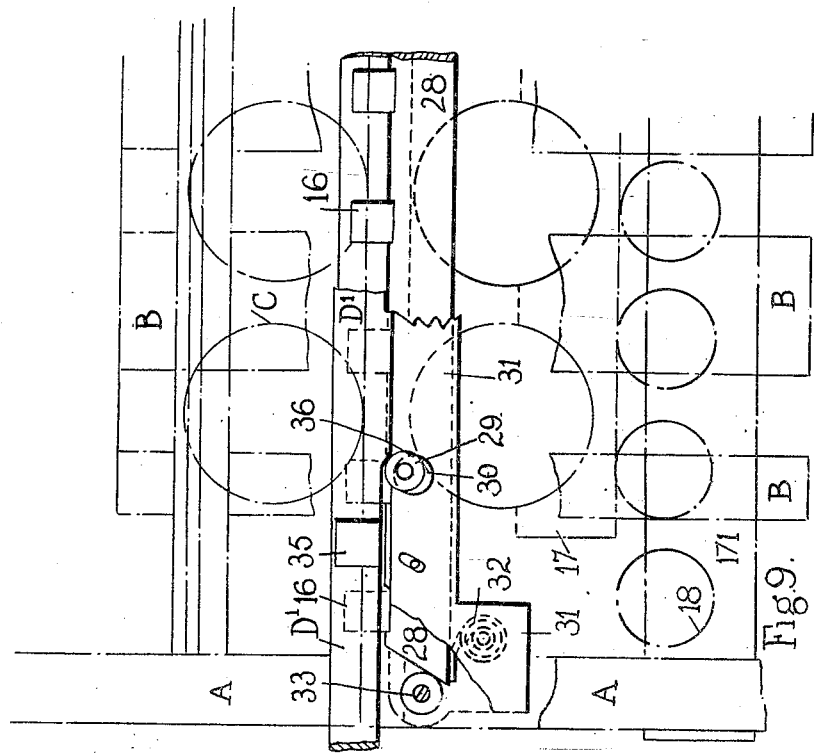
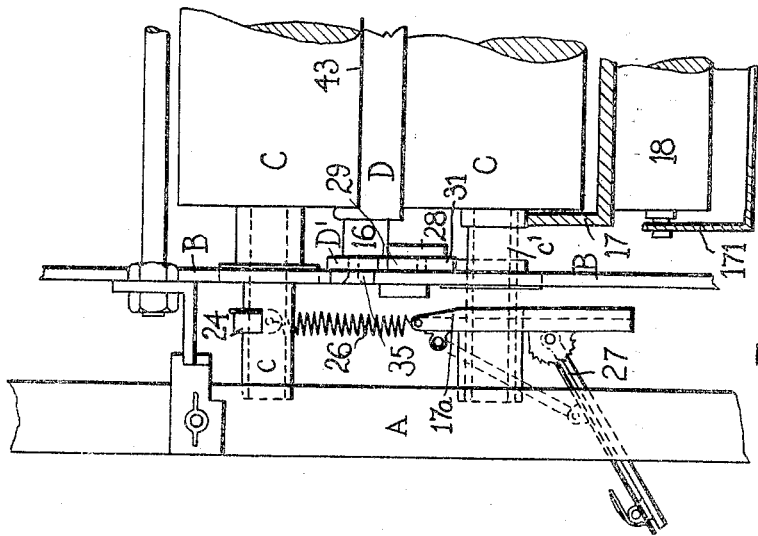
Inventor
Percival Brindle
By Norris & Patterson
Attorneys Patented Mar. 27, 1951

2,546,883

UNITED STATES PATENT OFFICE 2,546,883

MACHINE FOR MOLDING CONCRETE BLOCKS

Percival Brindle, Kirkby Stephen, England

Application December 16, 1949, Serial No. 133,286
In Great Britain December 31, 1948

7 Claims. (Cl. 25—21)

This invention relates to improvements in machines for the manufacture of concrete blocks, flags, kerbs, slates and similar articles.

According to the invention the machine comprises a feed hopper, trays for the articles passing under the hopper, a series of rollers for compressing the material in the trays and means for traversing the rollers over the carriage to compress the material therein.

The invention will be described with reference to the accompanying drawings.

Fig. 3 is a side elevation of the left hand side of the machine showing the rocking return conveyor in two positions;

Fig. 4 is a similar elevation of the right hand end;

Fig. 5 is a side elevation to a larger scale of a tray for the manufacture of slates;

Fig. 6 is a plan of same;

Fig. 7 is a transverse section of same;

Fig. 8 is a transverse section of a tray for the manufacture of concrete blocks;

Fig. 9 is a side elevation to a larger scale of part of the frame carrying the pressure rollers;

Fig. 10 is a part transverse section of same;

Fig. 11 is a plan partly in section showing the drive of a tray;

Fig. 12 is a transverse elevation of the guillotine and hole punching mechanism;

Fig. 13 is a side elevation of same.

Figure 1:
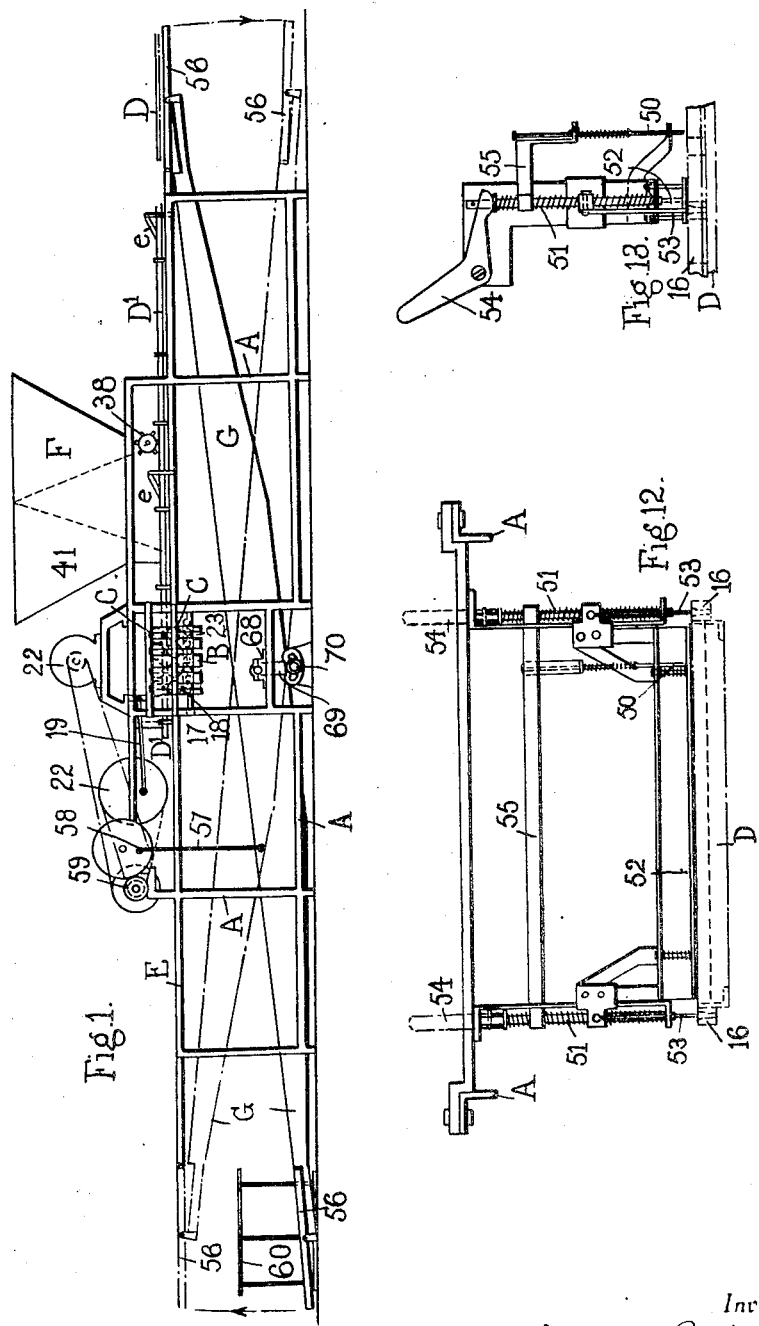
Fig. 1 is a diagrammatic elevation of the machine.

The machine comprises a main frame A supporting a reciprocating frame B carrying pressure rollers C through which trays D are traversed on a runway E under a feed hopper F, full trays being lowered from the runway E on a pivoted runway G by which they are transferred to the opposite end of the machine for refilling.

The trays D are formed as a skeleton frame provided with wheels 11 running on rails 12 extending longitudinally of the machine. Each tray is formed with a loose bottom 13 supported on longitudinal bearers 14. A loose platen 15 is inserted in the bottom of each tray. A slotted plate 16 is arranged along each longitudinal side of the tray by which it is intermittently traversed through the machine.

The reciprocating frame B is carried on a cradle 17 riding on a line of rollers 18, mounted transversely of the machine on a horizontal member 171 of the main frame A, over which rollers the cradle 17 and frame B are reciprocated by a connecting rod 19 one end of which is attached to the frame B and the other to a sprocket wheel 20 driven by a sprocket 21 and electric motor 22.

A series of pressure rollers C are mounted in vertical pairs in slots 23 in the frame B. Each pair of rollers in the top line are connected by a yoke 24 passing over their bearing spindles $c$, the rollers in the bottom line being carried by a cradle $17a$ passing under their bearing spindles $c^1$. The yokes 24 and cradle $17a$ are connected by tension springs 26. The tension on the springs 26 may be varied by a linkage mechanism 27. The spindles $c$ pass through slots in the frame B and may be raised therein to vary the distance between the upper and lower line according to the thickness of the slate or block to be produced.

Figure 2:
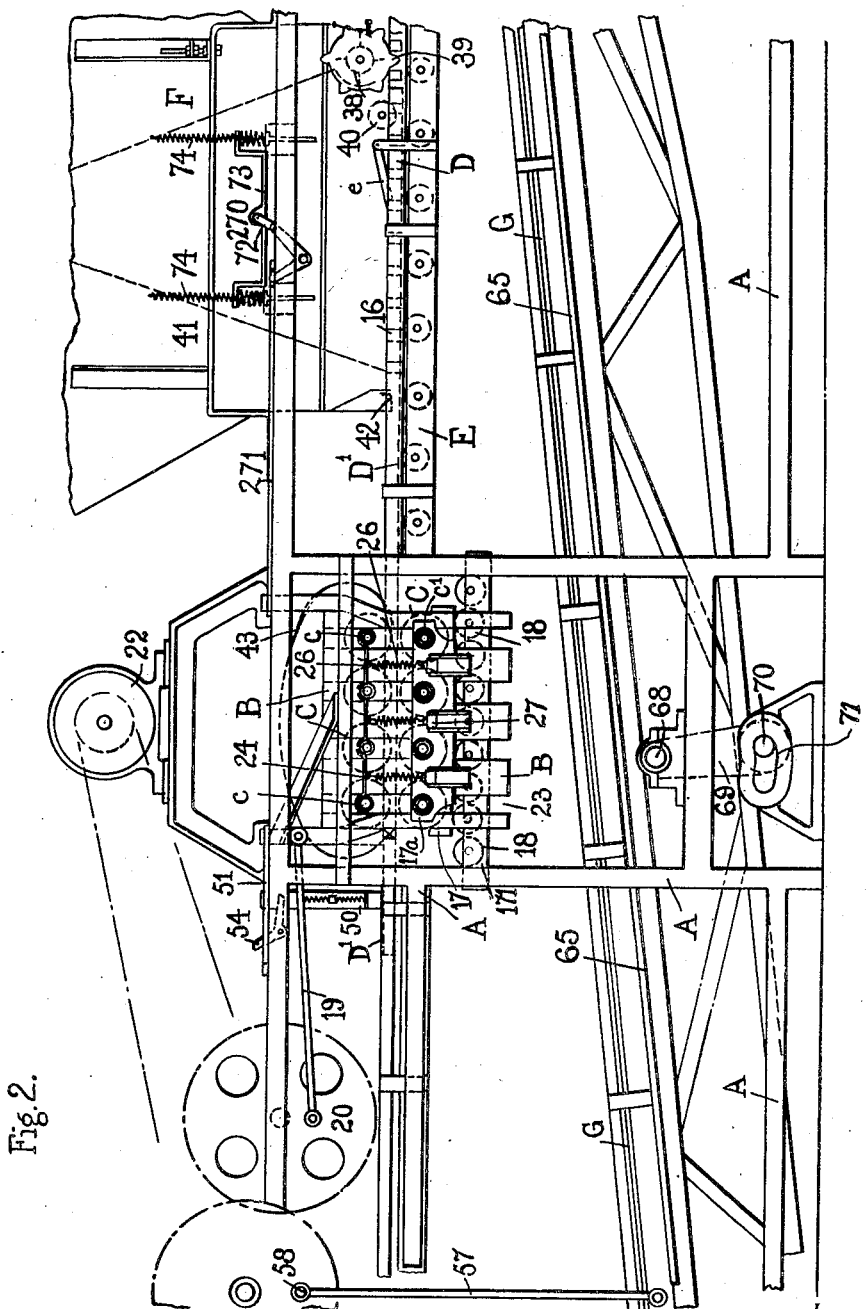
Fig. 2 is a side elevation of the centre section of the machine.

The trays D are fed along the runways E by flat rods $D^1$ at each side extending from the frame B to the feed end of the machine, projections $d$ thereon at intervals engaging the slots in the plate 16 to feed the trays forward intermittently. The trays during their passage between the upper and lower lines of pressure rollers C are prevented from moving rearwardly with the frame B by back stops $e$. A check plate 28 is mounted on rollers 29 engaging inclined slots 30 in a stationary plate 31 carried by the frame A. The check plate 28 is slotted along its upper edge to correspond with the plate 16 and is urged upwards into engagement therewith by springs 32. The end of the check plate 28 is inclined and engages a roller 33 on the frame A. The trays D are thus held stationary as the frame B reciprocates to the right in Fig. 2. As the frame B returns to the left a projection 34 thereon engages a projection 35 on the rod $D^1$ to carry this rod and with it the trays D towards the outlet end of the machine. As the rod $D^1$ is moved by the frame B a cam surface 36 thereon depresses the check plate 28 and releases the trays which traverse an adjustable distance through the machine. On the return stroke to the right the projection 34 on the frame B leaves the projection 35 and after travelling a predetermined portion of the stroke engages a lever 37 to retract the rod $D^1$ so that it may be in a position to feed the trays forward again on the next stroke of the frame B to the left. The stops $e$ are provided to prevent the trays D from running backwards.

In the manufacture of slates a shallow tray D is fed along the runway E under the feed hopper F holding a supply of concrete. The concrete is fed to the trays D by a feed roller 38 rotated by projections 39 thereon engaging the plate 16. A smoothing roller 40 may be provided to level out the concrete in the tray. From the feed roller 40 the trays advance intermittently to the other end of the hopper F and receive a coating layer of dry colour and cement from a chute 41, a doctor 42 levelling off the colour over the surface of the concrete in the tray. The trays then advance to the rollers C the upper line of which reciprocate over the surface of the trays whilst the lower line reciprocates under the bottom of the trays to prevent buckling during the pressure operation. In order to produce a level polished upper surface, the upper line of rollers C is enclosed by an endless band 43 which travels with the trays. The sides of the trays act as guides for the rollers which pass over the ends of the trays.

As the trays emerge from the rollers a punch 50 actuated by a rod 51 mounted on the frame B is operated to pierce a pair of holes in the concrete in the tray and a guillotine 52 inserts a transverse nick therein to enable easy server after the concrete has set. The hole punch is required to operate twice as often as the guillotine and when not required the downward movement of the guillotine is prevented by vertical rods 53 thereon engaging the plate 16 the lowering of the punch 50 being taken by springs by which it is raised on the return of the frame B.

The rod 51 engages a bell crank lever 54 to lower a frame 55 supporting the punch 50. When the guillotine operates the rods 53 pass through a hole in the plate 16.

The tray D then passes to the outlet end of the machine shown in upper part of Fig. 3. The conveyor E terminates in a platform 56 carried by a pivoted runway G. The runway G is raised and lowered by a connecting rod 57 controlled by a crank 58 rotated through gearing 59 from the motor 22. As the left hand end of the runway G is lowered with a tray D thereon, the bottom of the tray and its contents are deposited on a table 60, the skeleton of the tray D being lowered into the position shown in the lower position Fig. 3.

The platen 15 and the concrete slate thereon may then be removed for drying and the bottom of the tray replaced in the skeleton. As this end of the runway G is raised, the empty tray runs down to the opposite end and assumes a position as shown in the lower portion of Fig. 4. The tray impinges on a buffer spring or springs 61 and is prevented from rebounding by a spring catch 63. The ends of the runway G are provided with pivoted platforms 56 linked together by a rod 65 and levers 66 which prevent the platforms from tipping when in the upper positions. The empty tray is then raised to the upper position shown in Fig. 4, the catch 63 being released by a stop 67 to allow the tray to be propelled by the buffer spring or springs 61 on to the runway E to be refed to the feed hopper F.

The runway G is mounted in bearings 68 on the frame A and supported by a link 69 and roller 70 engaging a runway 71 on the base of the machine.

Where deeper trays D are employed for the manufacture of concrete blocks additional buffer springs 72 may be employed.

Further for the manufacture of blocks the feed roller for the concrete may be dispensed with, the concrete being tamped into the trays by tamping mechanism 270 operated by a rod 271 and levers 72 actuated by the frame B during its reciprocation. The tamping mechanism is carried by a frame 73, and is returned to its upper position by springs 74. The punch and guillotine mechanism are also disconnected.

I claim:

1. A machine for the manufacture of concrete slates, blocks and the like comprising a feed hopper, trays to receive the concrete from the hopper, a horizontally reciprocating frame, a cradle carried by the frame, a series of pressure rollers mounted in vertical pairs and supported by the cradle to reciprocate over and under the trays and means for traversing the trays intermittently and horizontally between the pairs of rollers.

2. A machine for the manufacture of concrete slates, blocks and the like as in claim 2, a crank arm by which the frame is reciprocated and a bar intermittently engaging the trays to feed the trays forward.

3. A machine for the manufacture of concrete slates, blocks and the like comprising a feed hopper, trays to receive the concrete passing under the feed hopper, a horizontally reciprocating frame, a cradle carried by the frame, a bottom line of rollers supported by the cradle, a top line of rollers, yokes connecting the top line of rollers in pairs, springs between the yokes and the cradle to draw the top line of rollers towards the bottom line of rollers to compress the concrete in the trays passing between the two lines of rollers, a crank arm by which the frame is reciprocated and a bar intermittently engaging the trays and the frame by which the trays are fed forward horizontally.

4. A machine for the manufacture of concrete slates, blocks and the like as in claim 4, a runway on which the trays are fed to the rollers, a delivery runway, a platform onto which the trays are delivered one at a time, a pivoted runway supporting the platform, a connecting rod operating the pivoted runway, a table upon which the bottom of a tray is deposited and means for traversing the empty tray to the feed end of the machine.

5. A machine for the manufacture of concrete slates, blocks and the like comprising a feed hopper, trays to receive the concrete from the hopper, a series of rollers between which the trays pass for compressing the concrete therein, a horizontally reciprocating frame supporting the rollers and means for traversing the trays intermittently and horizontally through the rollers, a feed and delivery runway, a platform onto which the trays are delivered one at a time, a pivoted runway supporting the platform, a connecting rod operating the pivoted runway, a buffer spring at one end of the runway compressed by a tray sliding thereto, a catch to retain the tray and release mechanism to free the catch when the tray is raised to the level of the feed runway to automatically supply an empty truck to the hopper.

6. A machine for the manufacture of concrete slates as in claim 6 and means for punching holes in and making the slates to size as they emerge from the pressing rollers.

7. A machine for the manufacture of concrete slates, blocks and the like comprising a feed hopper, trays to receive the concrete from the hopper, a series of rollers between which the trays pass and by which the concrete is compressed therein, runways for feeding the trays horizontally to and removing them from the rollers, means for reciprocating the rollers horizontally and for intermittently feeding the trays forward horizontally, means for locking the trays during the rearward stroke of the rollers, means for removing the bottom from the tray and returning the tray to the feed end of the machine and means for raising an empty tray for subsequent feeding to the hopper.

PERCIVAL BRINDLE.

REFERENCES CITED

The following references are of record in the file of this patent:

UNITED STATES PATENTS

| Number | Name | Date |
| --- | --- | --- |
| 2,185,959 | Vogel-Jorgensen | Jan. 2, 1940 |
| 2,386,665 | De Vigier | Oct. 9, 1945 |